UNITED STATES PATENT OFFICE 2,538,051

AQUEOUS SUSPENSION POLYMERIZATION IN THE PRESENCE OF METHYL HYDROXY-PROPYL CELLULOSE AS GRANULATING AGENT

John Leo Schick, Midland, Mich., assignor to The Dow Chemical Company, Midland, Mich., a corporation of Delaware No Drawing. Application November 23, 1949, Serial No. 129,178

6 Claims. (Cl. 260—85.5)

1

This invention relates to a method for polymerizing monomeric vinylidene chloride, monomeric vinyl chloride, and monomeric acrylonitrile and for copolymerizing vinylidene chloride with vinyl chloride or acrylonitrile in non-emulsified aqueous suspension under such conditions as to avoid agglomeration of the polymerizing particles and to produce reasonably uniform particles of a stable polymeric product at a practical rate.

There are three common, general methods of polymerization. When a single monomer or a homogeneous mixture of two or more monomers is polymerized without a solvent or diluent, and as a single liquid phase, to form a solid polymeric block, the process is variously called "mass" or "homogeneous" polymerization. This is to contrast it with the emulsion process in which one or more water-immiscible monomers (and catalyst) are dispersed in water by means of a "surface active" or emulsifying agent, to form a latex-like dispersion of fine particles of the polymeric body. Another process consists in mixing the monomers and catalyst with water, without using an emulsifying agent, and maintaining the dispersion by continued agitation at a temperature known to induce polymerization. The last outlined process is sometimes referred to as "granular" or "pearl" polymerization, but is also commonly called "suspension" polymerization. It is to this method of polymerization that the present invention relates.

Experience has shown that monomeric vinylidene chloride, acrylonitrile, or vinyl chloride, or mixtures of these in any proportions, can be polyymerized in aqueous suspension, using a peroxygen compound as a catalyst. It is found, however, that the product is often unsatisfactory for any of several reasons. The principal problem has arisen through the strong tendency of these materials, when polymerizing, to pass through a sticky and agglomerative condition in which the particles tend to merge with one another and to form large polymeric aggregates. Thus, it happens that polymer particles are formed which vary widely in size and, because of the exothermic nature of the polymerization reaction and the low rate of heat transfer through the polymer, the product varies from very low molecular weight material at the core of the large lumps to very high molecular weight material in the water-cooled layers. The products are heterogeneous, both in size and quality. The problem is not solved by increasing the rate of agitation, since this serves to increase the opportunities for the sticky particles to agglomerate and later, when polymerization is nearly complete, results in grinding the polymer to a fine powder. Attempts have been made to keep the polymerizing particles isolated from one another by thickening the aqueous phase, using water-soluble

2 gums or other protective colloids. These expedients are partially successful with these copolymers containing a preponderance of vinylidene chloride, but are relatively unsuccessful when applied to the copolymers rich in vinyl chloride. The tendency to agglomeration can be modified, in the case of high vinylidene chloride copolymers, by introducing particles of finished copolymer into the suspension, where they serve possibly as uniform nuclei for the freshly forming polymer, but this procedure, also, is ineffective with the high vinyl chloride copolymers.

The principal object of this invention is to provide a method for the polymerization of monomeric vinylidene chloride, monomeric vinyl chloride, and monomeric acrylonitrile, and for the copolymerization of vinylidene chloride with vinyl chloride or acrylonitrile in non-emulsified aqueous suspension, to produce reasonably uniform, fine particles of a stable polymeric product at a practical rate.

In considering the problem, it appeared possible that the difficulties arising from agglomeration might be minimized or eliminated if the rate of polymerization could be increased and the duration of the sticky state shortened. Any such increase in polymerization rate should be accomplished, if possible, without any great increase in temperature of the reaction, since it is known that molecular weight of polymers varies inversely with the polymerization temperature, other conditions being constant. Hence, consideration was given to the relative rates of polymerization caused by different catalysts. The systems subjected to test consisted of 3 parts by weight of water and 1 part by weight of a mixture of 75 per cent of vinyl chloride and 25 per cent of vinylidene chloride, by weight, together with 1 per cent of the catalyst under test. The monomers and catalyst were dispersed at a constant rate of agitation in a closed system, to prevent loss of monomers, and the agitated suspension was kept at 50° C. for periods up to 120 hours. The extent of polymerization and the condition of the polymer product were noted. Typical results appear in Table 1.

Table 1

| Catalyst | Time, hours | Per cent Polymerization | Description of Polymer |
|---|---|---|---|
| Benzoyl peroxide | 48 | 13.2 | Sticky mass. |
| Lauroyl peroxide | 48 | 15.8 | Do. |
| Hydrogen peroxide+Fe.[1] | 120 | 35.1 | Sticky mass on walls of vessel. |
| Sodium perborate | Exploded | | |
| Potassium persulfate | 48 | 27.0 | Sticky mass. |
| 2,4-dichlorobenzoyl peroxide | 24 | 99.0 | Hard white copolymer. |

[1] NOTE: 20 parts per million of iron, as ferric nitrate, in the aqueous phase.

None of the catalysts, except 2,4-dichlorobenzoyl peroxide, carried the reaction to a high enough conversion to polymer to pass beyond the objectionable sticky state, even though the reaction was continued in some cases as long as 120 hours. Even the rapid rate of polymerization obtained when using 2,4-dichlorobenzoyl peroxide failed to solve the problem, since the product was obtained only in the form of large hard lumps.

The tests were repeated, each mixture being modified by the addition of 2 per cent of a granulating agent, based on the weight of monomers, dissolved or suspended in the water phase. None of the tested granulating agents was effective when lauroyl peroxide, benzoyl peroxide, or potassium persulfate was used as catalyst in the system. A few of them exhibited a slight granulating action, but not enough to avoid the difficulties described above. When 2,4-dichlorobenzoyl peroxide was used as the catalyst, coarse granules were obtained with agar agar as the granulating agent, but the present problem appeared to be solved when using a low viscosity methyl hydroxypropyl cellulose, powdered hydrated aluminum oxide, or sulphonated polystyrene. The use of powdered hydrated aluminum oxide and sulphonated polystyrene for the present purpose is disclosed in my previously filed applications, Serial No. 94,731 and Serial No. 94,732, respectively (both filed on May 21, 1949), but those materials are limited in their application to high vinyl chloride-low vinylidene chloride copolymers, whereas the present application is concerned with the use of a low viscosity methyl hydroxypropyl cellulose as the granulating agent in the production of polymers of vinyl chloride, vinylidene chloride, acrylonitrile and of copolymers of vinylidene chloride with vinyl chloride or acrylonitrile.

According to the present invention, the desired results are obtained by polymerizing one or more of the stated monomers in aqueous suspension in the presence of catalytic amounts of 2,4-dichlorobenzoyl peroxide or of lauroyl peroxide while employing small amounts of a particular methyl hydroxypropyl cellulose as the granulating agent.

The cellulose ether here employed is made by the reaction between alkali cellulose and a mixture of a relatively large amount of methyl chloride and a much smaller amount of propylene oxide. The resulting cellulose ether product contains an amount of methoxyl groups in the usual range to provide solubility in water, i. e., from 25 to 32 per cent methoxyl content, and a relatively much smaller amount of hydroxypropyl substituents in the molecule, representing from 0.05 to 0.2 such groups per $C_6$ unit, to increase the gel point of aqueous solutions of the cellulose ether. While unmodified methyl cellulose, of a low to medium viscosity type, has a gel point of about 55° C., the here-employed double ether has a gel point of about 65° C. for medium viscosity types and near 70° C. for low viscosity types. Viscosity of these ethers is measured at 20° C. on a 2 per cent aqueous solution, and values up to about 30 centipoises are referred to as "low" viscosities while those from 40 to 60 centipoises are called "medium" viscosities. The preferred methyl hydroxypropyl cellulose here employed has a viscosity near 15 centipoises, measured according to the above-defined conditions.

Among the materials which failed to effect satisfactory granulation of a copolymer of 75 per cent vinyl chloride and 25 per cent vinylidene chloride, in the presence of 2,4-dichlorobenzoyl peroxide, are: fully polymerized powder of the same copolymer, bentonite clay, calcium silicate, lead silicate, magnesium hydroxide, magnesium pyrophosphate, methyl cellulose, polyvinylidene chloride, polyvinyl chloride, the water-soluble salt of polyacrylic acid, silicic acid, and high viscosity methyl hydroxypropyl cellulose. When lauroyl peroxide, benzoyl peroxide or potassium persulfate were substituted for 2,4-dichlorobenzoyl peroxide and similar tests were conducted, none of the following additional agents produced satisfactory granulation of the same copolymer: calcium carbonate, carboxymethyl cellulose and its sodium salt, casein, water-soluble hydroxyethyl cellulose, gelatin, triethylene glycol, higher polyethylene glycols, gum arabic, gum tragacanth, pectin, polyvinyl alcohol, sodium alginate, starch, and talc.

Not only is the troublesome and objectionable sticky stage avoided in the suspension polymerization or copolymerization of vinyl chloride, vinylidene chloride, and acrylonitrile using 2,4-dichlorobenzoyl peroxide or lauroyl peroxide and low viscosity methyl hydroxypropyl cellulose, but also the particle size of the copolymer is controllable by variation of the amount of the cellulose ether employed. Thus, when 0.5 per cent of this granulating agent is used, based on the weight of monomers originally present, a product is obtained, most of which passes a 50 mesh sieve (U. S. Sieve Series) and rests on a 70 mesh screen, while the use of 1 per cent of the same agent under otherwise identical conditions gives a product most of which passes through a 100 mesh sieve. This effect is illustrated in the following Table 2, in which the original monomer mixture was 75–25 vinyl chloride-vinylidene chloride, the phase ratio was 2 parts by weight of water per part by weight of monomer mixture, the catalyst was 0.2 per cent of 2,4-dichlorobenzoyl peroxide, based on the weight of monomers, the temperature of polymerization was 50° C., and the reaction was carried out in 50-gallon batches in a closed 50-gallon kettle having an anchor type of agitator turning at 88 revolutions per minute.

Table 2

| Methyl Hydroxypropyl Cellulose (15 cps.) | Per Cent Copolymer Retained on Various Sieves ||||||| 
|---|---|---|---|---|---|---|---|
| | 20 Mesh | 30 | 50 | 70 | 100 | 200 | Pan |
| 0.5 Per Cent | 0.0 | 0.0 | 9.9 | 69.0 | 12.3 | 6.2 | 2.6 |
| 1.0 Per Cent | 0.0 | 0.2 | 3.8 | 11.4 | 19.4 | 42.0 | 23.2 |

Some typical analyses of the particle sizes obtained in several batches of polymers and copolymers are illustrated in Table 3, in which the original monomer mixture varied with each batch as noted in the table, the temperature of polymerization was about 50° to 60° C., the granulating agent was 0.5 per cent of methyl hydroxypropyl cellulose (15 cps) based on the weight of monomers, the catalyst used was 0.2 to 0.4 per cent of lauroyl peroxide based on the weight of monomers, the phase ratio was about 2 to 3 parts by weight of water per part by weight of monomer mixture, and the reaction was carried out in 50-gallon batches in a closed 50-gallon kettle having an anchor type of agitation turning at 120 revolutions per minute.

Table 3

| Original Monomer Mixture | Per Cent Polymer or Copolymer Retained on Various Sieves | | | | | | |
|---|---|---|---|---|---|---|---|
| | 20 Mesh | 30 | 50 | 70 | 100 | 200 | Pan |
| 18% acrylonitrile-82% vinylidene chloride | 0.0 | 0.0 | 11.1 | 73.5 | 5.8 | 9.3 | 0.0 |
| 85% vinyl chloride-15% vinylidene chloride | 0.0 | 0.0 | 19.3 | 12.4 | 29.3 | 35.3 | 3.7 |
| 90% vinyl chloride-10% vinylidene chloride | 0.0 | 0.5 | 35.8 | 15.7 | 25.2 | 19.9 | 2.9 |
| 95% vinyl chloride-5% vinylidene chloride | 0.0 | 0.0 | 5.8 | 38.2 | 31.6 | 21.8 | 2.6 |
| 100% vinyl chloride | 0.0 | 0.0 | 0.9 | 35.7 | 26.1 | 33.0 | 4.3 |

Similarly, fine powders were obtained with no agglomeration, under the conditions of the above reaction, when the original monomer mixtures contained 100 per cent vinylidene chloride, 100 per cent acrylonitrile, and all mixtures of vinylidene chloride with vinyl chloride or acrylonitrile, and when the catalyst used was 2,4-dichlorobenzoyl peroxide or lauroyl peroxide and the granulating agent, as above, was low-viscosity methyl hydroxypropyl cellulose.

In contrast to the above results, it was found that under identical reaction conditions, when the original monomeric mixture was 75–25 vinyl chloride-vinylidene chloride, the addition of 0.1 to 2 per cent of high viscosity (3570 cps) methyl hydroxypropyl cellulose as the granulating agent, based on the weight of monomers, did not prevent agglomeration during polymerization, and resulted in coarse beads of polymer being produced instead of a fine powder as obtained when the low viscosity cellulose ether was employed. Similarly, when other granulating agents were introduced into the above-defined monomer mixture, such as 0.1 to 4 per cent of low viscosity methyl cellulose (10 cps) or high viscosity methyl cellulose (400 cps), large balls of polymer resulated. Likewise, polyvinyl chloride and a polymer of 82–18 vinylidene chloride-acrylonitrile formed balls and coarse beads when high viscosity methyl cellulose was used as the granulating agent. In the same fashion a polymer of 90–10 vinyl chloride-vinylidene chloride formed large balls when carboxymethyl cellulose was the granulating agent. The addition of low viscosity methyl hydroxypropyl cellulose to monomeric vinyl chloride, monomeric vinylidene chloride, monomeric acrylonitrile, and monomeric mixtures of vinylidene chloride with vinyl chloride or acrylonitrile has produced successfully and consistently a finely powdered polymer or copolymer where the addition of other granulating agents has failed. The result desired in the form and quality of the polymer or copolymer product is not obtained ordinarily until at least 70 per cent conversion of monomer to polymeric product has been attained.

The product, as obtained directly from the present process, has a significantly lower content of residual volatile monomer than that usually encountered, and the volatile content of the polymeric particles is found here to be directly proportional to the average size of the particles. Thus, when the particle size is decreased, as described above, either by reducing the rate of agitation or by increasing the amount of low viscosity methyl hydroxy-propyl cellulose used, the volatile content of the product is reduced.

The invention has been illustrated with respect to the polymerization of vinylidene chloride, vinyl chloride, and acrylonitrile and the copolymerization of vinylidene chloride with vinyl chloride or acrylonitrile. In each case, the suspension polymerization or copolymerization of such a mixture in the presence of from 0.2 to 1 per cent of a catalyst, based on the weight of monomers, selected from the group consisting of 2,4-dichlorobenzoyl peroxide and lauroyl peroxide, produces a polymer or copolymer at a practical rate and without any of the disadvantages arising from agglomeration of sticky particles. The suspension polymerization is carried out most satisfactorily when about 0.1 to 5 per cent of low viscosity methyl hydroxypropyl cellulose, based on the weight of monomers, is used as the granulating agent in a temperature range of about 25° to 65° C. It is not generally economical to carry out the process in the presence of more than 4 or less than 1 part by weight of water per part of monomer mixture.

When molded test specimens of a polymeric product made according to the present invention are compared with similar specimens molded from a standard commercial polymer or copolymer of the same analysis made in aqueous emulsion, the product of this invention is at least as resistant to discoloration by light and heat as is the emulsion polymer, whose particles are naturally much finer. When modified with the usual stabilizers, the polymers or copolymers of this process are more resistant to discoloration by light and heat than are the similarly modified polymers or copolymers made in aqueous emulsion.

I claim:

1. The method which comprises polymerizing a non-emulsified aqueous suspension of a monomeric polymerizable substance selected from the group consisting of vinylidene chloride, vinyl chloride, acrylonitrile, mixtures of vinylidene chloride with vinyl chloride, and mixtures of vinylidene chloride with acrylonitrile, in a closed system to prevent loss of monomer vapor, in the presence of from 0.2 to 1 per cent of a catalyst, based on the weight of monomer, selected from the group consisting of 2,4-dichlorobenzoyl peroxide and lauroyl peroxide, and from 0.1 to 5 per cent, based on the weight of monomer, of low viscosity methyl hydroxypropyl cellulose having a methoxyl content of from 25 to 32 per cent and containing from 0.05 to 0.2 hydroxypropyl groups per $C_6$ unit, the weight ratio of water to monomers being from 1:1 to 4:1, and maintaining the dispersion of the polymerizing particles by agitation at a temperature from 25° to 65° C. until at least 70 per cent polymerization has occurred.

2. The method as claimed in claim 1 wherein the monomeric polymerizable substance is a mixture consisting of vinylidene chloride and vinyl chloride.

3. The method as claimed in claim 1 wherein the monomeric polymerizable substance is a mixture consisting of vinylidene chloride and acrylonitrile.

4. The method as claimed in claim 1 wherein the monomeric polymerizable substance is vinyl chloride.

5. The method as claimed in claim 1 wherein the monomeric polymerizable substance is vinylidene chloride.

6. The method as claimed in claim 1 wherein the monomeric polymerizable substance is acrylonitrile.

JOHN LEO SCHICK.

(References on following page)

REFERENCES CITED

The following references are of record in the file of this patent:

UNITED STATES PATENTS

| Number | Name | Date |
|---|---|---|
| 1,877,856 | Hagedorn et al. | Sept. 20, 1932 |
| 2,265,913 | Lillienfeld | Dec. 9, 1941 |
| 2,438,480 | Stanton | Mar. 23, 1948 |
| 2,485,270 | Folt | Oct. 18, 1949 |

OTHER REFERENCES

Bennett, Concise Chemical and Technical Dictionary, 1947, Chem. Pub. Co., page 546.